(No Model.)

T. C. DUFF & R. I. ALLAN.
MACHINE FOR HOOPING BARRELS.

No. 291,583. Patented Jan. 8, 1884.

Witnesses,
Geo. H. Strong

Inventors,
Thos. C. Duff
R. I. Allan
Dewey & Co.
Attorneys

UNITED STATES PATENT OFFICE.

THOMAS C. DUFF AND ROBERT I. ALLAN, OF SAN FRANCISCO, CALIFORNIA.

MACHINE FOR HOOPING BARRELS.

SPECIFICATION forming part of Letters Patent No. 291,582, dated January 8, 1884.

Application filed July 10, 1883. (No model.)

*To all whom it may concern:*

Be it known that we, THOMAS C. DUFF and ROBERT I. ALLAN, of the city and county of San Francisco, and State of California, have invented an Improvement in Machines for Hooping Barrels; and we hereby declare the following to be a full, clear, and exact description thereof.

Our invention relates to a machine by which hoops may be forced upon barrels or casks; and it consists of a series of adjustable rollers attached to a driving mechanism by which they may be caused to travel around upon the edge of a hoop, (the cask standing vertically beneath for the purpose,) and, in combination therewith, of a means by which the rollers are carried downward as they revolve until the hoop has been forced on as far as necessary.

Figure 1:
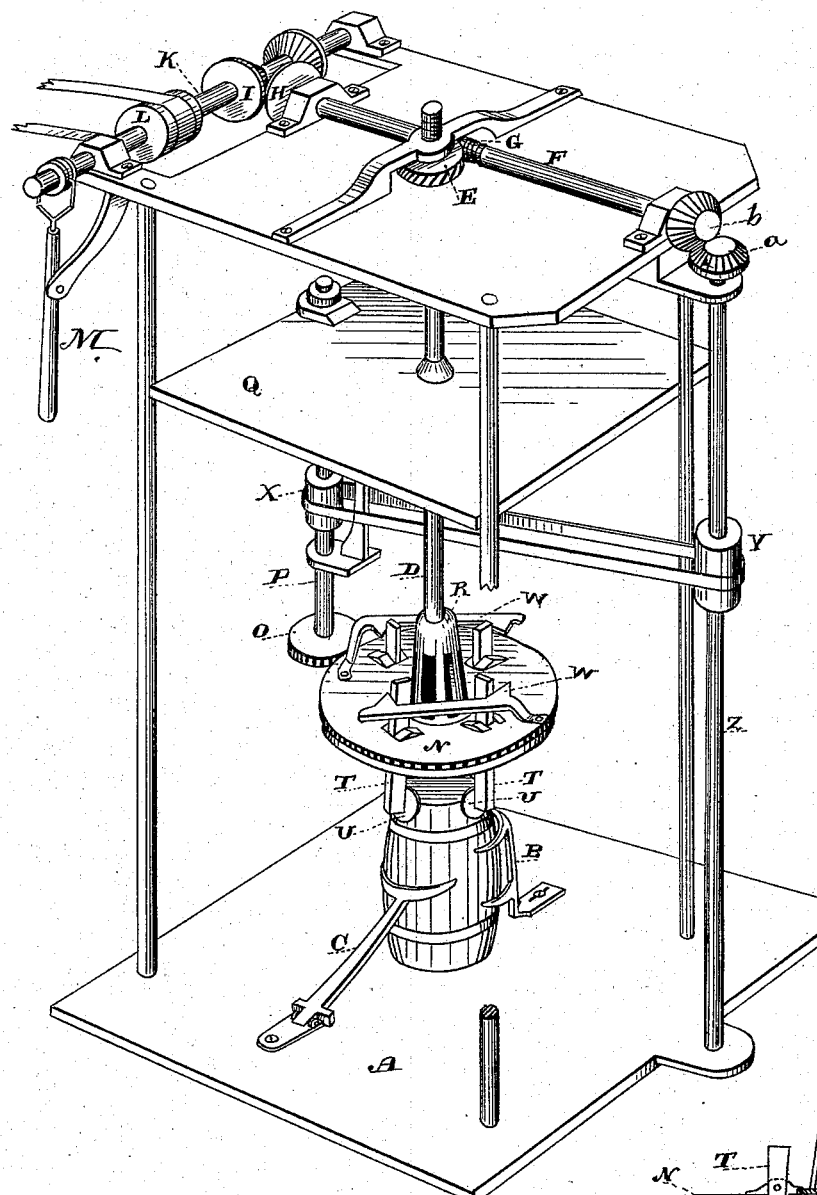
Figure 2:
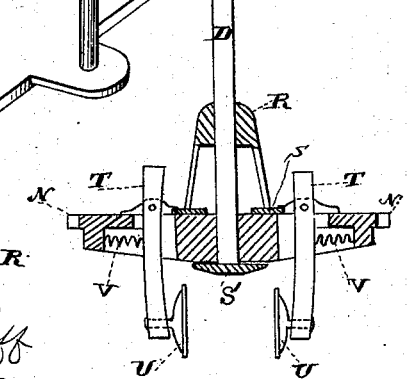

Referring to the accompanying drawings for a more complete explanation of our invention, Figure 1 is a view of the apparatus. Fig. 2 is a section of the gear N.

A is a base or floor having a fixed or adjustable clamp, B, and a hinged clamp, C, opposite to the first, between which the cask to be hooped may be firmly held in a vertical position, as shown. The clamps may be adjusted to suit casks of different sizes. In a line above the center of the cask is a vertical shaft, D, supported from a suitable framework above, and having at the top a screw-thread upon which a worm-gear, E, is fitted as a nut. A horizontal shaft, F, carries a screw or worm, G, which engages this gear and turns it so as to raise or lower the shaft D, the gear turning in a bracket or slot, which prevents its advancing in either direction. The shaft F is driven by a bevel-pinion, H, upon one end, which may be engaged by either of the pinions I J upon the shaft K. This shaft has a belt-pulley, L, through which it receives motion, and a shifting clutch-lever, M, serves to move the shaft endwise, so as to throw either of the pinions I or J into gear with the pinion H, and thus drive the shaft F so as to raise or lower the shaft D. This shaft D extends down through the hub of a horizontal gear-wheel, N, which turns loosely upon it and is driven by a pinion, O, upon the vertical shaft P. The shaft P has its boxes in a bracket supported from a platform, Q, which is fixed to the shaft D and moves downward with it and the gear-wheel N, so that the pinion will not be thrown out of gear by the movements of the shaft and gear.

Around the shaft D is a hub, R, having downwardly-projecting arms, with a large flange, S, at the bottom, so arranged as to rest upon the top of the gear-wheel and, in connection with a flange, S', on the lower end of shaft D, upon which said wheel rests, steady it in its rotation. Through this gear-wheel arms T pass downward, and have wheels U, supported upon horizontal axes at their lower ends, so as to run in vertical planes with their faces inward, as shown. The arms T are pivoted at the upper face of the gear-wheel, and springs V on the lower side press against them, so as to force their lower ends and the wheels U inward. The rims of these wheels are thus caused to run upon a hoop which has been placed upon the cask, and as the wheel N is revolved they travel around the cask, the springs keeping them in contact with it. At the same time the shaft D is being forced down by the action of the worm-gear before described, so that the hoop will be gradually forced upon the cask as far as desired. When this has been done, the motion of the shaft D is reversed until the screw raises the shaft-wheel N and the wheels U high enough to allow another hoop to be placed on the cask. When the last or head hoop is to be driven, the wheels U are spread so as to pass down the sides of the cask, and the wheel N, which is made convex on its lower surface, is forced down upon the hoop, thus driving it to place.

Upon the top of the wheel N are pivoted brackets or levers W, which press against the upper ends of the levers or arms T, when forced inward, and thus acting against the springs V, they force the rollers or wheels U away from the cask until a new hoop has been placed upon it.

In order to drive the vertical shaft P, with its pinion O, and through them the wheel N, a belt extends from a pulley, X, upon shaft P to a pulley, Y, upon the vertical shaft Z. Upon the upper end of this latter shaft is a bevel-pinion, a, which is engaged and driven by a bevel-pinion, b, upon the horizontal shaft F, before described, the revolution of the driving-wheels about the cask, and the feed by which they are moved downward being accomplished at the same time.

Having thus described our invention, what we claim as new, and desire to secure by Letters Patent, is—

1. In combination with mechanism for holding a barrel in a vertical and stationary position, consisting of the base A, having the fixed adjustable supports B, as shown, and the hinged clamp C, of a device for pressing hoops thereon, consisting of a series of wheels, U, attached to the lower ends of the pivoted arms T, and adapted to rest upon the upper edge of the hoop, means by which they are caused to roll around upon the edge of the hoop, and a means by which they are gradually moved downward, substantially as herein set forth and described.

2. A means for forcing hoops upon casks, consisting of the rollers or wheels U, supported upon arms so as to rest upon the upper edge of the hoop to be placed, the driving-wheel N, to which the arms are attached and by which they are revolved around the cask, and a feed-screw shaft, D, by which the wheels are moved downward, substantially as herein described.

3. In a machine for hooping barrels, the revolving wheel N, driven by the pinion O upon the shaft P, and provided with the pivoted hinged arm T, carrying the hoop-placing wheels U, the springs V, whereby the said arms are pressed toward each other, and the pivoted brackets W, adapted to press against the upper ends of the arms T, all substantially as shown, and for the purpose described.

4. In a barrel-hooping machine, the screw-threaded shaft D, provided with a gear, E, intermeshing with a screw, G, whereby the shaft is raised or lowered, the wheel N, and operating mechanism, in combination with the pivoted hoop-placing wheels U, supported at their lower ends, the pinion O, and shaft P, journaled to move up and down with the wheel N, the wheel being operated by the main driving-shaft and reversing-gear, all substantially as herein shown and described, and for the purpose set forth.

In witness whereof we have hereunto set our hands.

THOMAS C. DUFF.
ROBERT I. ALLAN.

Witnesses:
S. H. NOURSE,
HENRY C. LEE.